United States Patent
Balachandran et al.

(10) Patent No.: US 9,350,570 B2
(45) Date of Patent: May 24, 2016

(54) METHOD OF OPERATING A RECEIVER AND A RECEIVER

(71) Applicants: Krishna Balachandran, Morganville, NJ (US); Joseph H. Kang, Belle Mead, NJ (US); Kemal M. Karakayali, Hoboken, NJ (US); Kiran M. Rege, Marlboro, NJ (US)

(72) Inventors: Krishna Balachandran, Morganville, NJ (US); Joseph H. Kang, Belle Mead, NJ (US); Kemal M. Karakayali, Hoboken, NJ (US); Kiran M. Rege, Marlboro, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/491,473

(22) Filed: Sep. 19, 2014

(65) Prior Publication Data

US 2016/0087815 A1    Mar. 24, 2016

(51) Int. Cl.
*H04L 25/08*      (2006.01)
*H04L 25/02*      (2006.01)
*H04B 1/10*       (2006.01)

(52) U.S. Cl.
CPC ............ *H04L 25/024* (2013.01); *H04B 1/10* (2013.01)

(58) Field of Classification Search
CPC .......... H04L 27/2647; H04L 27/2618; H04B 1/1027; H04B 1/23
USPC ........... 375/346, 260, 267, 295; 330/127, 851
See application file for complete search history.

(56) References Cited

U.S. PATENT DOCUMENTS

| | | | |
|---|---|---|---|
| 2005/0094615 A1* | 5/2005 | Kim et al. | 370/349 |
| 2009/0304063 A1* | 12/2009 | Ki et al. | 375/232 |
| 2010/0159841 A1* | 6/2010 | Barberis et al. | 455/67.11 |

* cited by examiner

*Primary Examiner* — Khai Tran
(74) *Attorney, Agent, or Firm* — Harness, Dickey & Pierce, P.L.C.

(57) ABSTRACT

In one embodiment, the method includes determining, at a receiver, a total average received power over N resource elements and the L antennas, where N and L are integers greater than or equal to 1. The method further includes determining, at the receiver, a first bias in a first estimate of average received power for a received desired signal based on the determined total average received power; and generating, at the receiver, a first refined estimate of the average received power for the received desired signal based on the first estimate and the determined first bias.

22 Claims, 4 Drawing Sheets

METHOD OF OPERATING A RECEIVER AND A RECEIVER

BACKGROUND OF THE INVENTION

In several wireless communication scenarios, the received signal at a receiver antenna can be written in the following mathematical form:

$$r = hx + n, \quad (1)$$

where r is the signal detected at the receiver antenna, h is the complex-valued channel coefficient representing the gain of the wireless channel between the transmit antenna and the receive antenna, x is the transmitted symbol, and n is the sum of the noise and, possibly, some interference. Note that equation (1) could apply without loss of generality to a frequency domain representation of the received signal (i.e., a received subcarrier or tone in the case of an orthogonal frequency division multiplexing OFDMA or single carrier frequency division multiple access SC-FDMA based system like long term evolution LTE) or could also apply to an alternative time domain representation. Without loss of generality, it is further assumed here that the channel coefficient h includes the effect of transmit power and that the mean energy associated with the transmitted symbol is 1. Typically, the channel coefficient, h, is not known to the receiver. Consequently, in order to extract the transmitted symbols (or, through further processing, the transmitted information bits), the receiver generates an estimate of the channel coefficient, h. Methods or algorithms that are used by the receiver to generate the desired channel estimate(s) affect the overall performance of the communication system. These channel estimates also constitute a requirement for the implementation of many different coherent reception techniques, such as matched filter detection, equalization, multi-antenna processing (e.g. Maximal Ratio Combining, Minimum-Mean Squared Error reception with Interference Rejection Combining, or Maximum Likelihood reception), and interference cancellation. A more accurate channel estimate enables the communication system to operate at lower Signal-to-Interference-plus-Noise Ratios (SINR), which, in turn, leads to an increase in the system's capacity and/or range.

In a commonly used method to enable the receiver to estimate the channel coefficient, the transmitter periodically transmits a sequence of reference symbols that is also known to the receiver. (The reference symbols are also referred to as pilot symbols.) For example, in 3GPP's Long Term Evolution (LTE) standard, the transmitter uses a certain number of resource elements to transmit a sequence of reference symbols in each Physical Resource Block (PRB.) A PRB comprises a fixed number to time-frequency resource elements which can be used to transmit data or reference symbols. The receiver is expected to process the received signals over these resource elements to generate an estimate of the channel for that PRB. (The channel can be assumed to be more-or-less constant over a PRB.)

A well-known method that is often used to generate channel estimates from reference symbols is known as Linear Minimum Mean Squared Error (LMMSE) estimation. Assuming that the receiver is aware of the reference symbol sequences used by the desired signal as well as a few dominant interferers, the LMMSE channel estimation method may be described below.

Let r denote the vector of signals (at a receiver antenna) received over the resource elements in a resource block that are used for reference symbol transmission by the desired transmitter (that transmits the desired signal) as well as the interfering transmitters (that transmit the interfering signals). It is assumed that the channel is more or less constant over a resource block. Then, we can write the received vector r as:

$$r = \Sigma_{k=0}^{K} h_k q_k + n, \quad (2)$$

where the desired signal is referred to by the index k=0, and the dominant interferers (whose reference symbol sequences are known to the receiver) are referred to by indices k=1 through K. Thus, the channel coefficient for the desired signal is $h_0$, and the reference symbol sequence used by the desired transmitter is $q_0$; the corresponding quantities associated with the kth dominant interferer (k=1, 2, . . . , K) are $h_k$ and $q_k$. Then the estimate of the channel coefficient $h_k$, as determined by the LMMSE method, is given by:

$$\hat{h}_k = w_k^\dagger r, \text{ for } k=0, 1, 2, \ldots, K, \quad (3)$$

where $\hat{h}_k$ denotes the LMMSE estimate of the channel coefficient $h_k$, $w_k$ is the filter vector used by the channel estimation method to generate the estimate of $h_k$, and $(.)^\dagger$ denotes the conjugate-transpose of the corresponding matrix or vector. The filter vector $w_k$ is given by:

$$w_k = \pi_k [\Sigma_{j=0}^{K} \pi_j q_j q_j^\dagger + \sigma^2 I]^{-1} q_k, \quad (4)$$

where for j=0, 1, . . . , K, $\pi_j = E\{|h_j|^2\}$, denotes the expected value (average) of the received power for signal/interferer indexed j, and $\sigma^2$ is the sum of the average residual received powers that can be attributed to all interferers other than the K dominant and the thermal noise. I is an identity matrix of appropriate size. Note also that while the above description of the basic LMMSE channel estimation method was given in the context of a receiver with a single receive antenna, it can easily be applied to one with multiple antennas. For instance, a separate filter vector can be constructed using equation (4) for each antenna element and the corresponding LMMSE channel estimate can be obtained by processing the signals received at an antenna element by the corresponding filter vector in accordance with eq. (3). Those familiar with the art are well aware of such extensions.

It is clear from eq. (4) that the LMMSE channel estimation method requires knowledge of the average received powers for the desired signal as well as zero or more dominant interferers, and the average residual received power. Sometimes, estimates of these received powers are available to the receiver from some ongoing measurement process that continues alongside the main data transmission process. However, there are several scenarios where such measurements are not available so that the receiver is required to estimate these average received powers from the same resource block which contains the reference symbols that are meant to help the receiver generate channel estimates.

Assume that the received signal measurements comprise signals measured at L receiver antennas for N resource elements (or transmission symbols) constituting a resource block. M resource elements within this block of size N are used for reference (or pilot) symbols while the rest are for data symbols. Each of the desired signal transmitters and interferers transmits a distinct reference symbol sequence of length M over these M resource elements. The reference symbol sequences for different transmitters (including those that transmit desired signals and/or interferers) are distinct, but not necessarily orthogonal. Assuming that there is no other way to obtain the average power estimates for the desired signals and dominant interferers, the standard method for computing these power estimates works as described below.

For the desired signal or interferer identified by the index j, let $q_j$ denote the length-M column vector whose entries denote the reference symbols transmitted by the signal or interferer j over the M resource elements used for reference symbol transmission. Let r(l) (l=1, 2, ..., L) denote the column vector of symbols received by the lth antenna over those M resource elements. In order to compute the average received power estimate for the signal/interferer with index j, one de-rotates the received signal vectors r(l) (l=1, 2, ..., L) with the reference symbol vector $q_j$ for each of the L antennas, and divides the resulting (de-rotated) quantities by the square of the modulus of the reference symbol vector $q_j$. The resulting quantities, referred to as de-rotated measurements, are denoted by $(M(l))j$ for l=1, 2, ..., L. In other words, $(M(l))j = q_j^+ r(l)/|q_j|2$ for l=1, 2, ..., L, where $q_j^+$ denotes the conjugate transpose of the vector $q_j$.

The standard method then computes the estimate of the average received power for signal/interferer j by averaging the absolute square of the de-rotated measurements over the L receiver antennas. In other words, $\gamma_j$, the estimate of the average received power for signal/interferer j is given by:

$$\gamma_j = [|(M(1))_j|^2 + |(M(2))_j|^2 + \ldots + |(M(L))_j|^2]/L \quad (5)$$

This estimate is used in place of $\pi_j$ in equations (3) and (4) above to obtain the channel estimate. Then, using the channel estimate ĥ, the received signal may be processed to obtain the desired signal(s). For example, with reference to equation (1), the desired signal x̂ is given by:

$$\hat{x} = (\hat{h})^* r / |\hat{h}|^2 \quad (1A)$$

where $(\hat{h})^*$ is the complex conjugate of ĥ, and |ĥ| is the absolute value of ĥ.

Estimates of average received powers obtained in the above described manner are often noisy, and can lead to less-than-desirable performance.

SUMMARY OF THE INVENTION

At least one embodiment relates to operating a receiver such that errors in the estimate of the average received power or channel estimate are reduced or eliminated.

In one embodiment, the method includes determining, at a receiver, a total average received power over N resource elements and the L antennas, where N and L are integers greater than or equal to 1. The method further includes determining, at the receiver, a first bias in a first estimate of average received power for a received desired signal based on the determined total average received power; and generating, at the receiver, a first refined estimate of the average received power for the received desired signal based on the first estimate and the determined first bias.

In another embodiment, the method includes determining, at a receiver, whether a first estimate of an average received power for a received target signal meets a threshold condition; and replacing, at the receiver, the first estimate with a second estimate if the first estimate does not meet the threshold condition. Here, the threshold condition is whether the first estimate is greater than a power threshold.

In a further embodiment, the method includes determining, at a receiver, a total average received power over N resource elements and the L antennas, where N and L are integers greater than or equal to 1. The method further includes determining estimates of the average received power for each of a received desired signal and received dominant interferers; and determining a first noise estimate representing an average of residual noise and interference power at the receiver based on the determined total average received power and a sum of the determined estimates.

At least one embodiment relates to a receiver.

In one embodiment, the receiver includes a processor configured to determine a total average received power over N resource elements and the L antennas, where N and L are integers greater than or equal to 1. The processor is configured to determine a first bias in a first estimate of average received power for a received desired signal based on the determined total average received power; and the processor is configured to generate a first refined estimate of the average received power for the received desired signal based on the first estimate and the determined first bias.

BRIEF DESCRIPTION OF THE DRAWINGS

The example embodiments will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
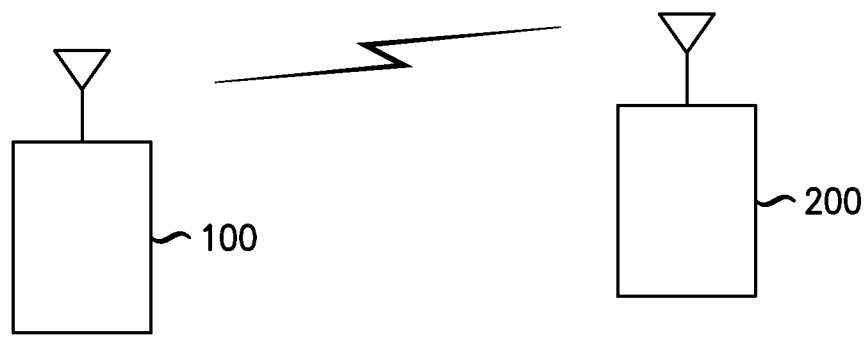
FIG. 1 illustrates wireless communication according to an example embodiment.

Various example embodiments will now be described more fully with reference to the accompanying drawings in which some example embodiments are shown.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms performed by a controller. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Note also that the software implemented aspects of example embodiments are typically encoded on some form of tangible (or recording) storage medium or implemented over some type of transmission medium. As disclosed herein, the term "storage medium" may represent one or more devices for storing data, including read only memory (ROM), random access memory (RAM), magnetic RAM, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "user equipment" may be synonymous to a mobile user, mobile station, mobile terminal, terminal, user, subscriber, wireless terminal, and/or remote station and may describe a remote user of wireless resources in a wireless communication network. Accordingly, terminal may be a wireless phone, wireless equipped laptop, wireless equipped appliance, etc.

The term "base station" may be understood as a one or more cell sites, base stations, nodeBs, enhanced NodeBs, access points, and/or any terminus of radio frequency communication. Although current network architectures may consider a distinction between mobile/user devices and access points/cell sites, the example embodiments described hereafter may generally be applicable to architectures where that distinction is not so clear, such as ad hoc and/or mesh network architectures, for example.

Communication from the base station to the terminal is typically called downlink or forward link communication. Communication from the terminal to the base station is typically called uplink or reverse link communication.

FIG. 1 illustrates wireless communication according to an example embodiment. As shown, a first device 100 communicates wirelessly with a second device 200. For example, in a wireless network, the first device 100 may be a base station and the second device 200 may be user equipment. However, the present invention is not limited to this example. Each of the first device 100 and the second device 200 transmits and receives, however, in one embodiment, the second device 200 may transmit only and the first device 100 may receive only.

For the purposes of explanation only, an example embodiment will be described with respect to the first device 100 and assuming that the first device 100 at least is a receiver (e.g., a base station at least includes a receiver). However, it will be appreciated that the description equally applies to any device capable of receiving wireless signals.

Figure 2:
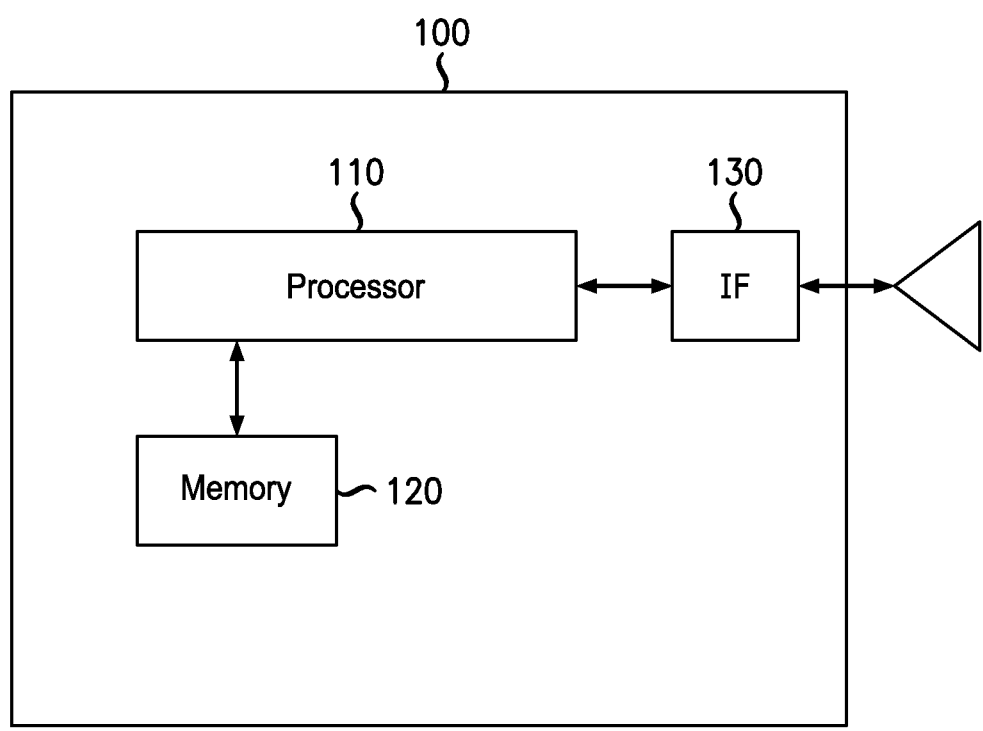
FIG. 2 illustrates one example of the first device in FIG. 1

FIG. 2 illustrates one example of the receiver 100. As shown, the receiver 100 includes a processor 110, connected to a memory 120, various interfaces 130, and an antenna 150. As will be appreciated, depending on the implementation of the receiver 100, the receiver 100 may include many more components than those shown in FIG. 2. However, it is not necessary that all of these generally conventional components be shown in order to disclose the illustrative embodiment.

Memory 120 may be a computer readable storage medium that generally includes a random access memory (RAM), read only memory (ROM), and/or a permanent mass storage device, such as a disk drive. Memory 120 also stores operating system and any other routines/modules/applications for providing the functionalities of the receiver 100 (e.g., functionalities of a base station, methods according to the example embodiments, etc.). These software components may also be loaded from a separate computer readable storage medium into memory 120 using a drive mechanism (not shown). Such separate computer readable storage medium may include a disc, tape, DVD/CD-ROM drive, memory card, or other like computer readable storage medium (not shown). In some embodiments, software components may be loaded into memory 120 via one of the various interfaces 130, rather than via a computer readable storage medium.

Processor 110 may be configured to carry out instructions of a computer program by performing the basic arithmetical, logical, and input/output operations of the system. Instructions may be provided to processor 110 by memory 120.

The various interfaces 130 may include components that interface the processor with an antenna, or other input/output components. As will be understood, the interfaces 130 and programs stored in the memory 120 to set forth the special purpose functionalities of the first device 100 will vary depending on the implementation of the first device.

Next, operation of the receiver 100 according to an example embodiment will be described. As discussed above, assume that the received signal measurements comprise signals detected at L receiver antennas for N resource elements (or transmission symbols) constituting a resource block, where N and L are integers greater than or equal to 1. M resource elements within this block of size N are used for reference (or pilot) symbols while the rest are for data symbols. Each of the desired signals and interferers transmits a distinct reference symbol sequence of length M over these M resource elements. The reference symbol sequences for different signals and/or interferers are distinct, but not necessarily orthogonal. Assuming that there is no other way to obtain the average power estimates for the desired signals and dominant interferers, the standard method for computing these power estimates works as described below.

For the desired signal or interferer identified by the index j, let $q_j$ denote the length-M column vector whose entries denote the reference symbols transmitted by the signal or interferer j over the M resource elements used for reference symbol transmission. Let r(l) (l=1, 2, ..., L) denote the column vector of symbols received by the lth antenna over those M resource elements. In order to compute the average received power estimate for the signal/interferer with index j, one de-rotates the received signal vectors r(l) (l=1, 2, ..., L) with the reference symbol vector $q_j$ for each of the L antennas, and divides the resulting (de-rotated) quantities by the square of the modulus of the reference symbol vector $q_j$. The resulting quantities, referred to as de-rotated measurements, are denoted by (M(l))j for l=1, 2, ..., L. In other words, (M(l))j=$q_j^+$r(l)/|$q_j$|$^2$ for l=1, 2, ..., L, where $q_j^+$ denotes the conjugate transpose of the vector $q_j$.

The standard method then computes the estimate of the average received power for signal/interferer j by averaging the absolute square of the de-rotated measurements over the L receiver antennas. In other words, $\gamma_j$, the estimate of the average received power for signal/interferer j is given by equation (5) repeated below:

$$\gamma_j = [|(M(1))_j|^2 + |(M(2))_j|^2 + \ldots + |(M(L))_j|^2]/L \quad (5)$$

Different example embodiments for use alone or in combination with one another that improve the quality of the average power estimates include: removal of bias from the average power estimate of a signal/interferer, thresholding the average power estimates, and obtaining and thresholding of the estimate of residual noise and interference power.

Removal of Bias from the Average Power Estimate of a Signal/Interferer.

As stated above, $\gamma_j$, the standard method's estimate of the average received power for signal/intereferer indexed j, contains a bias, which can cause distortion in the LMMSE estimator based on this average received power estimate. Accordingly, one example embodiment involves reducing or removing this bias from all average received power estimates. To that end, an estimate of this bias is computed for each of the desired signals and dominant interferers.

According to an example embodiment, the bias in $\gamma_j$, the standard method's estimate of the average received power for signal/interferer j, is determined as:

$$b_j = (\Sigma_k \pi_k - \pi_j + \sigma^2)/|q_j|^2 \quad (6)$$

where $b_j$ denotes the bias in $\gamma_j$, $\sigma^2$ represents the sum of thermal noise power and the average interference caused by non-dominant interferers, $|q_j|^2$ is the square of the modulus of the reference symbol vector $q_j$, and $\pi_k$ ($\pi_j$) denotes the actual average received power for signal/interferer k (j). ($\sigma^2$ is also referred to as the actual average residual power.) Since the quantities $\pi_k$, $\pi_j$, $\sigma^2$ are not known, they are estimated by processing the received powers at the L antennas over all of the N resource elements in the block.

Let, for l=1, 2, ..., L, $p^{(l)}$ denote the estimate of the average received power for the antenna. Then assuming that for each signal and interference source the transmit power for data symbols equals that for reference symbols, $p^{(l)}$, the estimate of the total average received power for antenna l, is given by $$p^{(l)} = [|r_1^{(l)}|^2 + |r_2^{(l)}|^2 + \ldots + |r_N^{(l)}|^2]/N, \quad (7)$$

where $r_1^{(l)}, r_2^{(l)}, \ldots r_N^{(l)}$ represent the received symbols over the N resource elements (at the $l^{th}$ antenna) in the block being processed. $P_{av}$, the estimate of the total average received power is then computed by taking the average of the total average received powers for the L antennas, namely, $p^{(1)}, p^{(2)}, \ldots, p^{(L)}$. Thus, $$P_{av} = [p^{(1)} + p^{(2)} + \ldots + p^{(L)}]/L \quad (8)$$

We use $P_{av}$ as our estimate of the total average received power, i.e. ($\Sigma_k \pi_k + \sigma^2$), and $\gamma_j$ (i.e. the standard method's estimate of the average received power for signal/interferer j) as the estimate of the average received power for signal/interferer indexed j. Then we approximate $b_j$, the bias in the standard method's estimate of the average received power for the signal/interferer j, by $$b_j \approx (P_{av} - \gamma_j)/|q_j|^2 \qquad (9)$$

We remove this bias from the standard method's estimate of the average received power for the signal/interferer indexed j to obtain a refined estimate $\xi_j$:

$$\xi_j = \gamma_j - b_j = \gamma_j - (P_{av} - \gamma_j)/|q_j|^2 \qquad (10)$$

In this manner, the standard method's estimates of the average received powers are refined (by removing bias) for all of the desired signals and dominant interferers.

Figure 3:
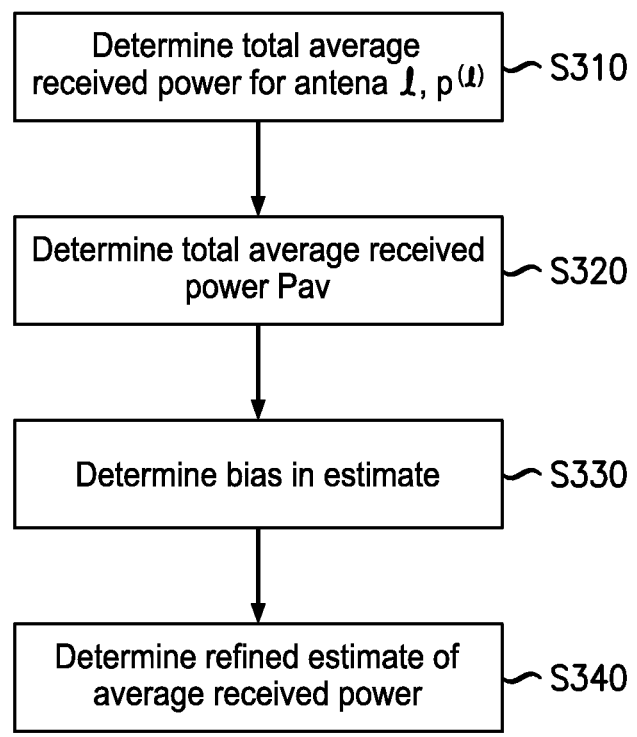
FIG. 3 illustrates a flow chart of the method of removing the bias in an estimate total average received power according to an example embodiment.

FIG. 3 illustrates a flow chart of the method of removing the bias in an estimate total average received power according to an example embodiment. The method of FIG. 3 will be described as implemented by the processor 110 of the receiver 100, but it will be appreciated that the present invention is not limited to this example.

As shown, in step S310, the processor 110 receives (aggregate) received signal values (also referred to as received signal symbols) from the interfaces 130, and determines the per-antenna total average received power for each antenna 1 according to equation (7). Using these per-antenna total average received powers, the processor 110 then determines the total average received power $P_{av}$ according to equation (8) in step S320. Next, in step S330, the processor 110 determines the bias in the standard method's estimate of the average received power for the signal/interferer j according to equation (9) using the determined total average received power, $\gamma_j$ (i.e. the standard method's estimate of the average received power for signal/interferer j), and the square of the modulus of the reference symbol vector $q_j$. The processor 110 determines the refined estimate of the average received power $\xi_j$ using the standard method's estimate and the determined bias according to equation (10) in step S340.

As will be appreciated, using the refined estimate of the average received power $\pi_j$, the processor 110 may determine the channel estimate using equations (3) and (4), and may further process and obtain a received signal using the determined channel estimate according to equation (1A).

Thresholding the Total Average Power Estimate.

While the removal of bias from standard method's estimates of the average received powers improves the quality of those estimates, it does not make them noise-free. The noise in such an estimate can make it unreliable, especially if the magnitude of that estimate is small. In order to address this problem, we compare the refined estimate with a power threshold such as, for instance, $\alpha \cdot P_{av}$ where the proportionality factor $\alpha$ equals 0.10 or 0.05, etc. Alternatively, the power threshold may be a fixed value determined through empirical study. (For example, the power threshold may be set to $\delta$ times the power associated with the thermal noise, where $\delta$ is another proportionality factor. The thermal noise is typically known to system designers. If the refined estimate is greater than the power threshold, it is retained as it is; otherwise it is set equal to some suitably chosen small value, e.g. half or a quarter of the power threshold value (fixed or variable). This thresholding is applied to all of the refined estimates. In case the first step (i.e. removal of bias) is skipped, the thresholding may be applied directly to the average received power estimates produced by the standard method.

Figure 4:
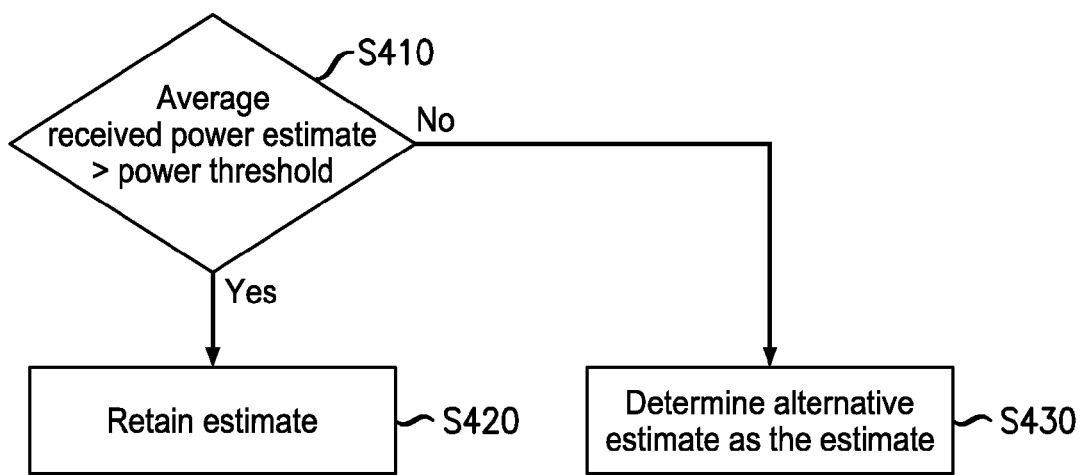
FIG. 4 illustrates a flow chart of the method of thresholding a total average power estimate.

FIG. 4 illustrates a flow chart of the method of thresholding a total average power estimate. The method of FIG. 4 will be described as implemented by the processor 110 of the receiver 100, but it will be appreciated that the present invention is not limited to this example.

As shown, in step S410, the processor 110 compares the estimate of the total average received power with a power threshold. The estimate of the total average received power may be the refined estimate produced by the method of FIG. 3 or the standard estimate of equation (5). The power threshold may be, for instance, $\alpha \cdot P_{av}$ where the proportionality factor $\alpha$ equals 0.10 or 0.05, etc. Alternatively, the power threshold may be a fixed value determined through empirical study. If the estimate is greater than the threshold, it is retained in step S420; otherwise an alternative estimate is determined as the estimate. Namely, the alternative estimate replaces the estimate. For example, the alternative estimate may be equal to some suitably chosen small value, e.g. half or a quarter of the power threshold.

As will be appreciated, using the thresholded estimate of the average received power $\pi_j$, the processor 110 may determine the channel estimate using equations (3) and (4), and may further obtain a received signal using the channel estimate according to equation (1A).

Determining and Thresholding an Estimate of Residual Noise and Interference Power.

The quantity $\sigma^2$ such as in equation (4) represents the true average of the residual noise and interference power. Given that we have calculated estimates of the average received powers associated with the desired signal(s) and dominant interferers (e.g., $\gamma_j$ or $\xi_j$), and the total received power (i.e. $P_{av}$), an estimate for $\sigma^2$ according to an example embodiment is determined as "$P_{av}$–sum of estimates of the average received powers associated with the desired signal(s) and dominant interferers." We denote this estimate by $P_{res}$ and refer to it as noise estimate. Because of the noise in the estimates of the average received powers associated with the desired signal(s) and dominant interferers, $P_{res}$ can fall below 0, which can make the LMMSE channel estimator ill-behaved. To address this problem, we compare $P_{res}$ with another threshold, such as, for instance, $\beta$. The noise threshold $\beta$ may be fixed or proportional to $P_{av}$, and may be a design parameter determined through empirical study. If $P_{res}$ is greater than or equal to $\beta$, we leave it as it is. Otherwise, the noise estimate (i.e., $P_{res}$) is set equal to some suitably chosen alternative estimate value such as 0.05 $P_{av}$, or the thermal noise floor, which is usually known to the system designers/administrators.

Figure 5:
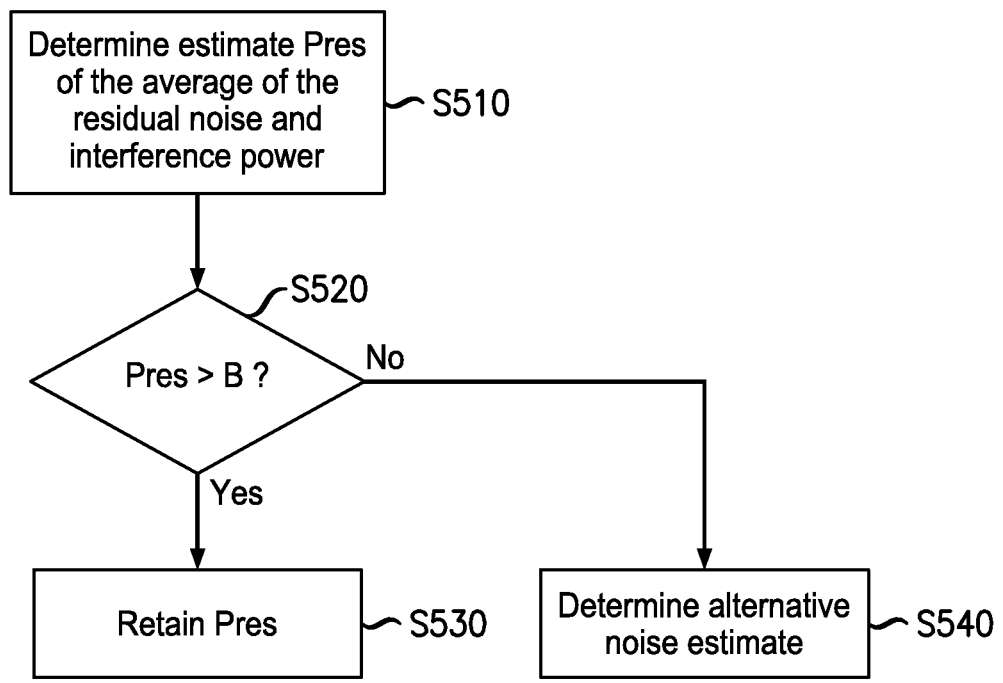
FIG. 5 illustrates a flow chart of the method of determining and thresholding an estimate of residual noise and interference power according to an example embodiment.

FIG. 5 illustrates a flow chart of the method of determining and thresholding an estimate of residual noise and interference power according to an example embodiment. The method of FIG. 5 will be described as implemented by the processor 110 of the receiver 100, but it will be appreciated that the present invention is not limited to this example.

In step S520, the processor 110 determines an estimate of the average of the residual noise and interference power. The estimate of the residual noise and interference power may be determined as $Pres = P_{av}$–sum of estimates of the average received powers associated with the desired signal (s) and dominant interferers Here, the estimates may be estimates produced by the standard model, or the refined estimates according to the method of FIG. 3.

The processor 110 compares this noise estimate Pres to a noise threshold $\beta$ in step S520. This noise threshold may be a fixed value or proportional to $P_{av}$, and a design parameter determined through empirical study. If $P_{res}$ is greater than or equal to $\beta$, then in step S530, the processor 110 leaves the noise estimate Pres unchanged. Otherwise, an alternative noise estimate is determined, such as 0.05 $P_{av}$, or the thermal noise floor, which is usually known to the system designers/administrators.

As will be appreciated, using the thresholded estimate of the residual noise and interference power (e.g., estimate of $\sigma^2$ such as in equation (4)), the processor 110 may determine the channel estimate using equations (3) and (4), and may further obtain a received signal using the channel estimate according to equation (1A).

The techniques described above improve the quality of the estimates produced by the standard method. When used to construct LMMSE channel estimators, these improved estimates result in significantly better performance.

The invention being thus described, it will be obvious that the same may be varied in many ways. Such variations are not to be regarded as a departure from the invention, and all such modifications are intended to be included within the scope of the invention.

We claim:

1. A method of operating a receiver, comprising:
   determining, at a receiver, a total average received power over N resource elements and the L antennas, where N and L are integers greater than or equal to 1;
   determining, at the receiver, a first bias in a first estimate of average received power for a received desired signal based on the determined total average received power; and
   generating, at the receiver, a first refined estimate of the average received power for the received desired signal based on the first estimate and the determined first bias.

2. The method of claim 1, further comprising:
   determining a second bias in a second estimate of average received power for a received dominant interferer of the received desired signal; and
   generating a second refined estimate of the average received power for the received dominant interferer based on the second estimate and the determined second bias.

3. The method of claim 1, further comprising:
   determining a channel estimate associated with the received desired signal based on the first refined estimate.

4. The method of claim 1, further comprising:
   obtaining a processed signal based on the determined channel estimate and the received desired signal.

5. The method of claim 1, wherein the determining a first bias determines the first bias based on the determined total average received power, the first estimate, and the received desired signal.

6. The method of claim 1, further comprising:
   determining whether the first refined estimate meets a threshold condition; and
   replacing the first refined estimate with an alternative estimate if the first refined estimate does not meet the threshold condition.

7. The method of claim 6, wherein the threshold condition is whether the first refined estimate is greater than a power threshold.

8. The method of claim 6, further comprising:
   determining a channel estimate associated with the received desired signal based on one of the first refined estimate and the alternative estimate.

9. The method of claim 8, further comprising:
   obtaining a processed signal based on the determined channel estimate and the received desired signal.

10. The method of claim 8, further comprising:
    determining a first noise estimate representing an average of residual noise and interference power at the receiver; and wherein
    the determining the channel estimate determines the channel estimate associated with the received desired signal based on the determined first noise estimate and one of the first refined estimate and the alternative estimate.

11. The method of claim 10, wherein the determining a first noise estimate determines the first noise estimate based on the determined total average received power and the one of the first refined estimate and the alternative estimate.

12. The method of claim 10, further comprising:
    determining whether the first noise estimate meets a noise threshold condition; and
    replacing the first noise estimate with a second noise estimate if the first noise estimate does not meet the noise threshold condition.

13. A method of operating a receiver, comprising:
    determining, at a receiver, whether a first estimate of an average received power over N resource elements and the L antennas, where N and L are integers greater than or equal to 1, for a received target signal meets a threshold condition; and
    replacing, at the receiver, the first estimate with a second estimate if the first estimate does not meet the threshold condition.

14. The method of claim 13,
    wherein,
    the threshold condition is whether the first estimate is greater than a power threshold.

15. The method of claim 14, wherein the received target signal is one of a received desired signal and a received dominant interferer of the received desired signal.

16. The method of claim 14, further comprising:
    determining a channel estimate associated with the received target signal based on one of the first estimate and the second estimate.

17. The method of claim 16, further comprising:
    obtaining a processed signal based on the determined channel estimate and the received target signal.

18. A method of operating a receiver, comprising:
    determining, at a receiver, a total average received power over N resource elements and the L antennas, where N and L are integers greater than or equal to 1;
    determining estimates of the average received power for each of a received desired signal and received dominant interferers; and
    determining a first noise estimate representing an average of residual noise and interference power at the receiver based on the determined total average received power and at least one of the determined estimates.

19. The method of claim 18, further comprising:
    determining whether the first noise estimate meets a noise threshold condition; and
    replacing the first noise estimate with a second noise estimate if the first noise estimate does not meet the noise threshold condition.

20. The method of claim 19, further comprising:
    determining a channel estimate associated with the received desired signal based on one of the first noise estimate and the second noise estimate.

21. The method of claim 20, further comprising:
    obtaining a processed signal based on the determined channel estimate and the received desired signal.

22. A receiver comprising:
a processor configured to determine a total average received power over N resource elements and the L antennas, where N and L are integers greater than or equal to 1;
the processor configured to determine a first bias in a first estimate of average received power for a received desired signal based on the determined total average received power; and
the processor configured to generate a first refined estimate of the average received power for the received desired signal based on the first estimate and the determined first bias.

* * * * *